United States Patent
An et al.

(10) Patent No.: US 8,488,731 B2
(45) Date of Patent: Jul. 16, 2013

(54) SLICING LEVEL AND SAMPLING PHASE ADAPTATION CIRCUITRY FOR DATA RECOVERY SYSTEMS

(75) Inventors: Fu-Tai An, Taipei (TW); Jen-Tai Hsu, Miaoli (TW)

(73) Assignee: Global Unichip Corporation, Hsinchu (TW)

( * ) Notice: Subject to any disclaimer, the term of this patent is extended or adjusted under 35 U.S.C. 154(b) by 359 days.

(21) Appl. No.: 12/929,548

(22) Filed: Feb. 1, 2011

(65) Prior Publication Data
US 2012/0020444 A1    Jan. 26, 2012

(30) Foreign Application Priority Data
Jul. 21, 2010 (TW) .............................. 99123890 A

(51) Int. Cl.
*H04L 7/00* (2006.01)

(52) U.S. Cl.
USPC ............................................ 375/355; 375/371

(58) Field of Classification Search
USPC .................... 375/355, 371, 373, 376
See application file for complete search history.

(56) References Cited

U.S. PATENT DOCUMENTS

| 7,092,689 | B1 * | 8/2006 | Boecker et al. | 455/260 |
| 7,149,269 | B2 * | 12/2006 | Cranford et al. | 375/373 |
| 8,130,891 | B2 * | 3/2012 | Kim et al. | 375/375 |
| 2010/0074314 | A1 * | 3/2010 | Stojanovic et al. | 375/226 |

* cited by examiner

*Primary Examiner* — David B. Lugo
(74) *Attorney, Agent, or Firm* — Bacon & Thomas, PLLC

(57) ABSTRACT

The invention creates a slicing level and sampling phase adaptation circuitry for data recovery systems. The invention explores the boundary of the eye opening to decide the optimal slicing level and sampling phase with a simple bit error rate estimation technique. Bit error rate estimation is achieved with several collaborating samplers.

20 Claims, 8 Drawing Sheets

SLICING LEVEL AND SAMPLING PHASE ADAPTATION CIRCUITRY FOR DATA RECOVERY SYSTEMS

BACKGROUND OF THE INVENTION

1. Field of the Invention

This invention relates to a slicing level and sampling phase adaptation circuitry, more particularly to a slicing level and sampling phase adaptation circuitry for data recovery systems.

2. Description of the Prior Art

Clock and data recovery circuit is an important component in digital communication systems. The applications include many point-to-point digital communication systems, such as Asynchronous Transfer Mode (ATM), Synchronous Optical Network (SONET), Synchronous Digital Hierarchy (SDH), Fiber Distributed Data Interface (FDDI), Ethernet, Wavelength Division Multiplexing (WDM), Dense Wavelength Division Multiplexing (DWDM), and interface of universal serial bus (USB) between personal computer and external devices.

With the rapid development of multimedia applications and the evolution of manufacturing technology continuing, the clock frequencies on the processing chip was over than 3 GHz. In recent years, the high-speed serial link also encroached on the board level as a standard interface of host computer to reduce the transmission line and power consumption, such as series-ATA and PCI-Express. In the need for more and more data processing, system performance is limited by the transmission problems. Furthermore, the Internet's wide variety of applications needs to transfer huge data rate nowadays. To deal with such throughput demand in this limited Channel has became an inevitable trend.

As the noise of the signal posed by the impact of the increased transfer rate during transmission is increased seriously. Channels interaction (Cross Talk), Electromagnetic Disturbance (EMI), or signal reflections caused by impedance mismatch, the channel itself will generate attenuation of the signals to certain degree. In addition, non-ideal signals transmitting brings shift of frequency and phase . . . and so on. How to achieve high-speed transmission, reduce the limited channel bandwidth and external noise, and then receive the correct data is becoming a formidable problem. Consequently, the issue in data recovery technology for high-speed link transfer is bound with an extremely important role.

FIG. 1 shows a PLL-based CDR (Phase Locked Loop-based Clock and Data Recovery) circuit according to the prior art. Conventional PLL-based CDR circuit including Phase Detector 11, Charge Pump 12, Low-Pass Filter (LPF) 13, and voltage-controlled oscillator (VCO) 14 suffers from device speed limitations with increasing data rates, degradation of on-chip Q for inductors (if an LC-VCO is used), 50 percent duty-cycle problems, data feed through, increased VCO jitter (due to high-VCO gain resulting from supply voltage reduction) and poor performance in the presence of asymmetric jitter. In order to achieve high data rates while maintaining an acceptable performance, reduced-rate architectures are employed. A novel ⅛th-rate PD implementation is reported. A preferred data eye pattern is reasonably symmetric both vertically (in amplitude) and horizontally (in time) as shown in FIG. 2A. In this case, despite that there is jitter and amplitude noise, the best sampling point is at 0.5 UI, and the slicing level is 0 (in the center of the eye.) FIG. 2B shows the case where data eyes have ASE noise. Since the +1 level has much more noise than the −1 level, moving the slicing threshold downward makes the distances from the slicing level to +1 and −1 equal. This will help the system bit error rate performance.

FIG. 3A shows an eye opening with excessive amount of noise according to the prior art. The conventional art may use only two samplers; a fixed sampler in the "middle" of the eye and an adjustable sampler to explore the eye boundary. As long as the two samplers agree on the results; they stay in the eye opening. On the other hand, if the results mismatch, the adjustable sampler enters the clouded area of the eye. This scheme works if the eye opening is reasonably wide and the fixed sampler situated in the center is indeed obtaining the right result. However, if there is too much noise and the center sampler itself is getting the wrong result, the conventional scheme may break as illustrated in FIG. 3B and FIG. 3B.

Conventional clock and data recovery systems assume that the optimal slicing level is in the middle of the vertical height of the eye and the optimal sampling point is halfway between the bit boundaries. However, many non-idealities, including noise, nonlinearities, dispersion, unbalanced rise and fall time, etc, shift the optimal slicing level up or down and sampling point advanced or retarded from the center point.

Due to various effects, including but not limited to amplified spontaneous emission noise, nonlinearity, waveform distortion, unbalanced rise and fall time, etc., in the optical and electrical systems, the optimal slicing level might not be in the center of the eye. The optimal sampling phase might also not be in the middle of the bit. Conventional data recovery systems assuming slicing level's locating in the middle and sampling point in the middle of the bit only reaches sub-optimal performance.

The conventional approach to find the slicing level is to sweep the slicing level and measure the bit error rate. Since it is very unlikely to have a training sequence before data transmission and the real-time bit error rate measurement can introduce humongous area/power penalty, Modern communication systems long for more elegant solutions.

SUMMARY OF THE INVENTION

The purpose of this invention is to provide a slicing level and sampling phase adaptation circuitry for data recovery systems, which combining data recovery system can easily find the optimal slicing level and the most favorable sampling phase such that the system bit error rate is minimized. Bit error rate estimation is achieved with several collaborating samplers.

Another purpose of this invention is to provide a slicing level and sampling phase adaptation circuitry for data recovery systems, which can find best slicing level and sampling phase without real-time BER measurement.

To achieve the above-mentioned objective, one embodiment of the present invention provides a slicing level and sampling phase adaptation circuitry for data recovery systems, including a slicing level adjustment element receiving processed data and frequency division signals, comparing the processed data and the frequency division signals for a phase difference, wherein the phase difference is fed back to the input of the slicing level adjustment element to rectify the processed data; a sampling period adjustment element receiving the processed data and time division signals and comparing the processed data and the time division signals for a timing margin, wherein the timing margin is fed back to the input of the sampling period adjustment element to adjust the frequency division signals, then becoming the time division signals; and a clock and data recovery loop receiving the processed data, and recovering system clock signals from the processed data, wherein the system clock signals are transferred to next stage circuitry; wherein the clock and data recovery loop receives the timing margin for the adjustment of system clock signals transferred to the slicing level adjustment element and the sampling period adjustment element.

To achieve the above-mentioned objective, one embodiment of the present invention provides a slicing level and sampling phase adaptation circuitry for data recovery systems, including a slicing level adjustment assembly receiving processed data and frequency division signals, outputting a plurality of slicing levels; a slicing level controller being coupled to the slicing level adjustment assembly, receiving the plurality of slicing levels, wherein the plurality of slicing levels are compared for a phase difference fed back to adjust the processed data; a sampling period adjustment assembly receiving the processed data and time division signals, outputting a plurality of sampling phases; a sampling period controller coupled to the sampling period adjustment assembly, receiving the plurality of sampling phases, wherein the plurality of sampling phase are compared for a timing margin fed back to adjust the time division signals; and a clock and data recovery loop receiving the processed data, and recovering system clock signals from the processed data, wherein the system clock signals are transferred to next stage circuitry; wherein the clock and data recovery loop receives the timing margin for the adjustment of system clock signals for the slicing level adjustment assembly and the sampling period adjustment assembly.

To achieve the above-mentioned objective, one embodiment of the present invention provides a slicing level and sampling phase adaptation circuitry for data recovery systems, including a sampling circuit receiving processed data and frequency division signals, outputting a plurality of slicing levels and a plurality of sampling phases; a control circuit being coupled to the sampling circuit, receiving the plurality of slicing levels, wherein the plurality of slicing levels are compared for a phase difference fed back to adjust the processed data; wherein the control circuit receiving the plurality of sampling phase, comparing the plurality of sampling phase for a timing margin fed back to adjust the time division signals; a clock and data recovery loop receiving the processed data, and recovering system clock signals from the processed data, wherein the system clock signals are transferred to next stage circuitry; wherein the clock and data recovery loop receives the timing margin to adjust the frequency division signals for the sampling circuit.

Other advantages of the present invention will become apparent from the following description taken in conjunction with the accompanying drawings, which are set forth by way of illustration and example, to certainly embody the present invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The detailed explanation of the present invention is described as following. The described preferred embodiments are presented for purposes of illustrations and description, and they are not intended to limit the scope of the present invention.

The invention discloses a slicing level and sampling phase adaptation circuitry for data recovery systems, which can help the data recovery system easily find the optimal slicing level and the most favorable sampling phase such that the system bit error rate is minimized. The system can be used in the circuit bus or the optical fiber communication system.

Figure 1:
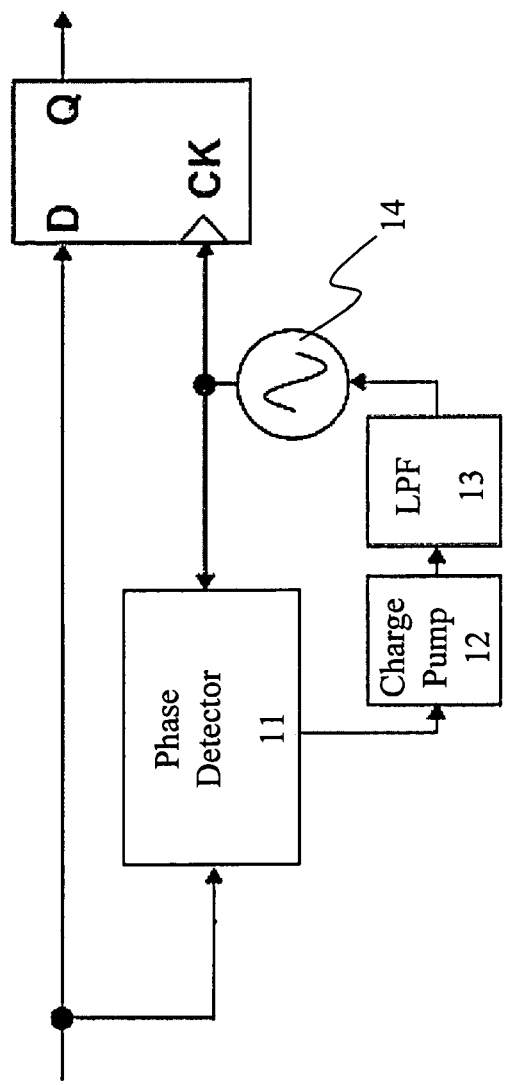
FIG. 1 is a diagram showing a PLL-based CDR circuit according to the prior art.
Figure 2B:
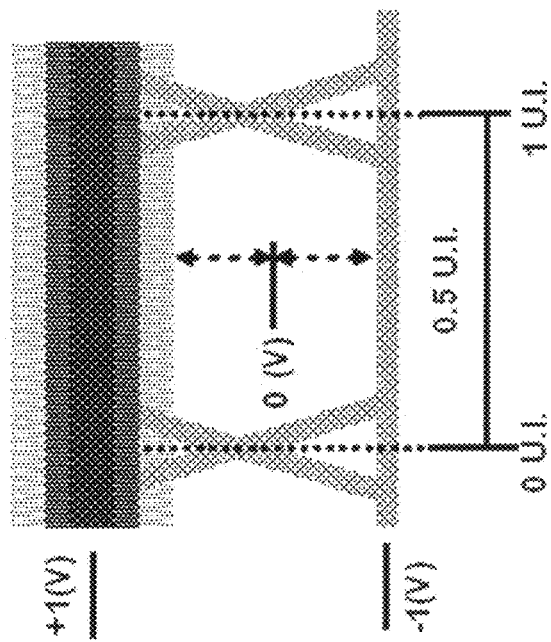
FIGS. 2A and 2B are diagrams showing eye patterns according to the prior art.
Figure 2A:
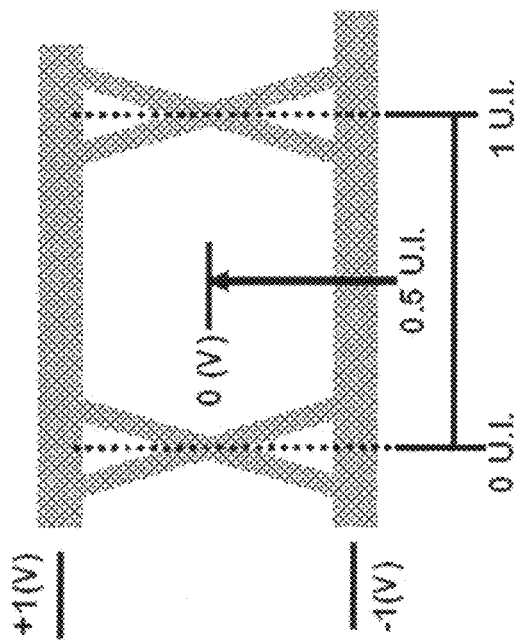
Figure 3A:
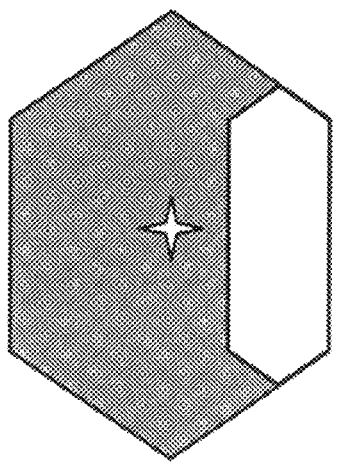
FIGS. 3A, 3B and 3C are diagrams showing eye opening with excessive amount of noise according to the prior art.
Figure 3B:
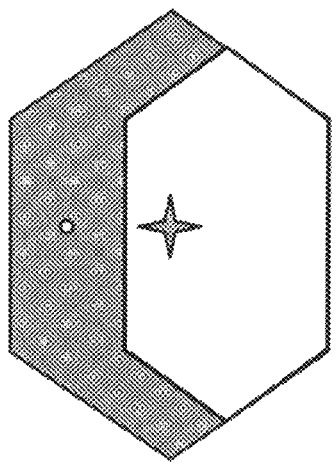
Figure 3C:
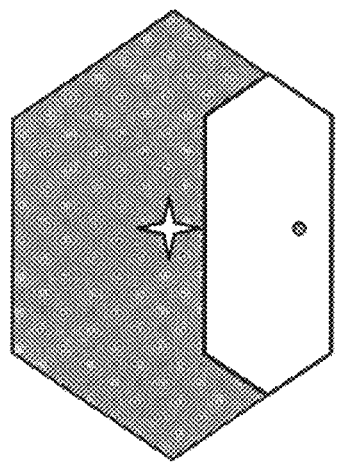
Figure 4:
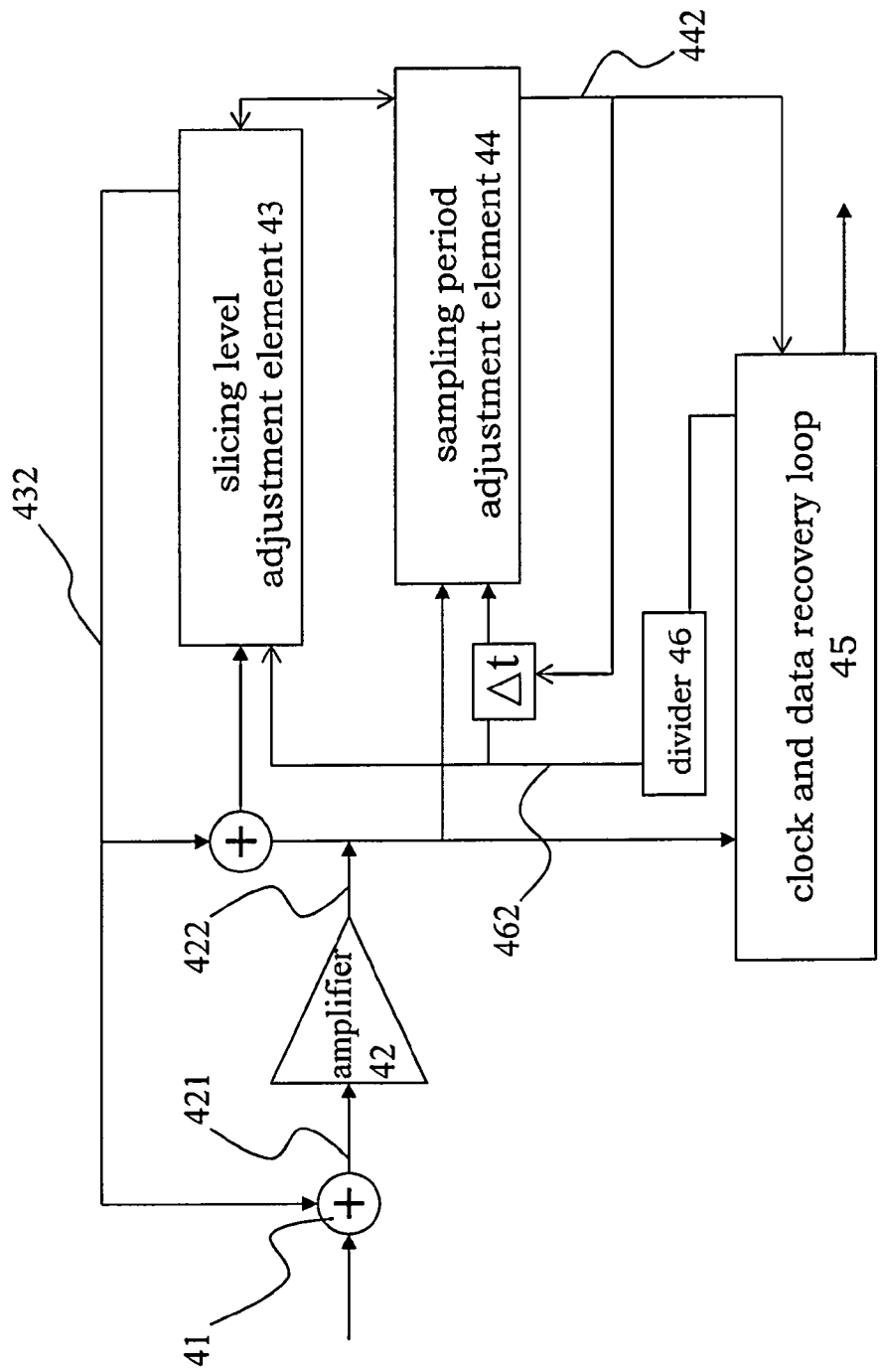
FIG. 4 is a schematic diagram illustrating a slicing level and sampling phase adaptation circuitry for data recovery systems according to one embodiment of the present invention.

FIG. 4 is a schematic diagram illustrating a slicing level and sampling phase adaptation circuitry for data recovery systems according to one embodiment of the present invention. Amplifier 42 coupled to the slicing level adjustment element 43, sampling period adjustment element 44, and clock and data recovery loop 45, receives and amplifies unprocessed data 421, and then outputs processed data 422. Amplifier 42 is a linear amplifier or a limited amplifier.

Still referring to FIG. 4, slicing level adjustment element 43 receives processed data 422 and frequency division signals 462, and compares processed data 422 with frequency division signals 462 for a phase difference, which is fed back to the input of the slicing level adjustment element 43 to adjust unprocessed data 421. Additionally, the input of amplifier 42 is electrically coupled to adder 41, which receives phase difference 432 to adjust unprocessed data 421.

As FIG. 4, sampling period adjustment element 44 receives processed data 422 and time division signals, and compares processed data 422 with the time division signals for timing margin 442, which is fed back to the input of the sampling period adjustment element 44 to adjust frequency division signals 462, then becomes the time division signals. And the slicing level adjustment element 43 communicates with the sampling period adjustment element 44 for adjustment there between.

Still as FIG. 4, clock and data recovery loop 45 receives processed data 422, and recovers system clock signals from processed data 422, wherein the system clock signals are transferred to next stage circuitry. Clock and data recovery loop 45 receives timing margin 442 for the adjustment of system clock signals to the slicing level adjustment element 43 and the sampling period adjustment element 44. Furthermore, the system clock signals from clock and data recovery loop 45 are divided through divider 46, which outputs frequency division signals 462 to the slicing level adjustment element 43 and the sampling period adjustment element 44.

Accordingly, FIG. 4 showing the slicing level adjustment element 43 coupled to the sampling period adjustment element 44 can work with existing clock recovery system seamlessly. Also, the algorithm is adaptive; no training sequence or interruption is required to perform bit error rate estimation. The invention also helps expanding the eye opening horizontally when there is a limiting amplifier.

Figure 5:
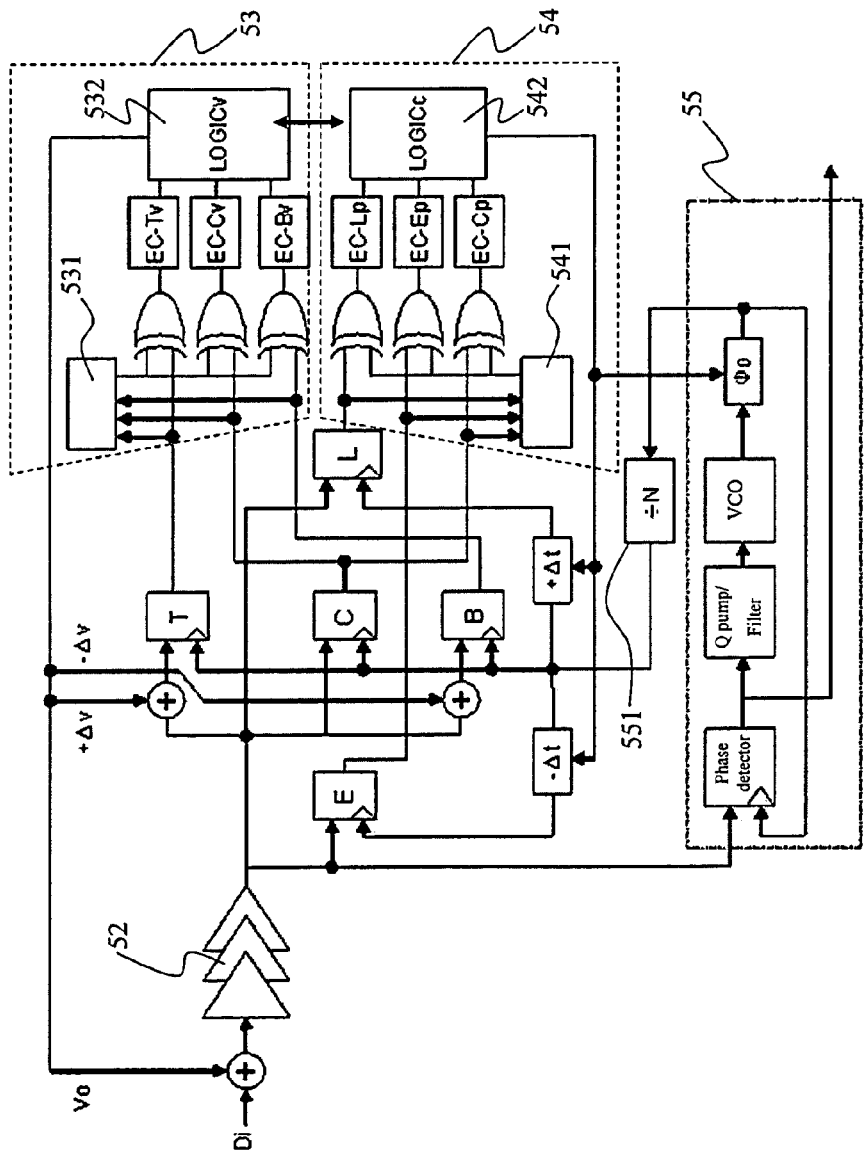
FIG. 5 is a schematic diagram illustrating a slicing level and sampling phase adaptation circuitry for data recovery systems according to one embodiment of the present invention.

FIG. 5 is a schematic diagram illustrating a slicing level and sampling phase adaptation circuitry for data recovery systems according to one embodiment of the present invention. The slicing level adjustment assembly has Sampler B, Sampler T and Sampler C, for each of the samplers receiving the data from amplifier 52 and clock signals from divider 551, and then outputting slicing levels respectively. The slicing level controller 53 is coupled to the Sampler B, Sampler T and Sampler C for receiving corresponding phase differences, which are compared to produce a phase difference $+\Delta v$ and $-\Delta v$ fed back to adjust the data.

Accordingly, FIG. 5 showing Sampler T, Sampler C, and Sampler B has the same sampling phase. The slicing level of Sampler T is $\Delta v$ higher than that of Sampler C; the slicing level of Sampler B on the other hand is $\Delta v$ lower than that of Sampler C. The comparator circuit 531 calculates three samplers to determine the slicing level. Every time the three outputs from Samplers do not reach a unanimous agreement, an error occurs and the sampler with minority opinion probably has touched the eye boundary. By manipulating $\Delta v$ and the slicing level of Sampler C, the upper bound and lower bound of the eye opening at a particular sampling phase is determined. Logic unit 532 outputs $+\Delta v$ to sampler T, $-\Delta v$ to sampler B, and $V_o$ to amplifier 52 to adjust the consecutive data.

As shown in FIG. 5, the sampling period adjustment assembly has sampler E, sampler L and Sampler C, each of samplers receiving the data and the time division signals, outputting sampling phases respectively. The sampling period controller 54 is coupled to Sampler E, Sampler L and Sampler C, receiving the corresponding sampling phases, which are compared to produce a timing margin fed back to adjust the time division signals.

Still as FIG. 5, Sampler E, Sampler C, and Sampler L have the same slicing level (threshold) but the Sampler E's sampling phase leads that of Sampler C by $\Delta t$, while the Sampler L's sampling phase lags of Sampler C by $\Delta t$. By tuning the sampling phase of Sampler C and $\Delta t$, timing margin of the eye can be explored at certain slicing level.

In FIG. 5, clock and data recovery loop 55 receives the data from amplifier 52, and recovers system clock signals from the data, which are transferred to next stage circuitry. The system clock signals are divided by divider 551, then being output the clock signals to the samplers in the slicing level adjustment assembly and the sampling period adjustment assembly. Wherein, clock and data recovery loop 55 receives the timing margin for the adjustment of system clock signals to the slicing level adjustment assembly 53 and the sampling period adjustment assembly 54.

Referring to FIG. 5, the invention in the beginning mandates the slicing level and sampling phase of all samplers to be either the same or very close such that all of them have a unanimous vote. Control logic 531 moves the slicing level of Sampler T and Sampler B outwards until bit errors start to appear. Control logic 541 also changes the sampling phases of Sampler E, Sampler C, and Sampler L such that a time margin profile is established. Depending on the link characteristic, optimal sampling phase and slicing level of Sampler C can be determined.

Please referring to FIG. 5 input data (Di) passes through either linear or limiting amplifiers. Five samplers are presented. Sampler T, Sampler C, and Sampler B form a group to determine the slicing level; Sampler E, Sampler C, and Sampler L collaborate with each other to explore timing margin. Outputs of the three samplers in a group case a majority vote. Error is observed comparing the vote with the individual result. Two groups communicate with each other if necessary. The clock from the clock and data recovery loop is divided down N times to save the power and area of the samplers and the following circuitry clock and data recovery loop can possibly merge with the samplers.

Figure 6B:
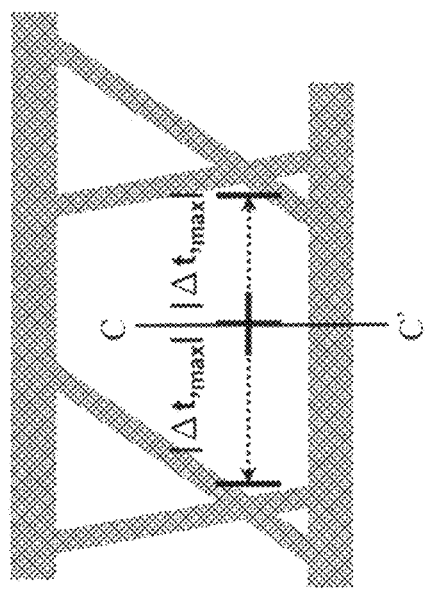
FIG. 6B is a schematic diagram illustrating slicing level adjusted to the point where timing margin is maximized according to one embodiment of the present invention.
Figure 6A:
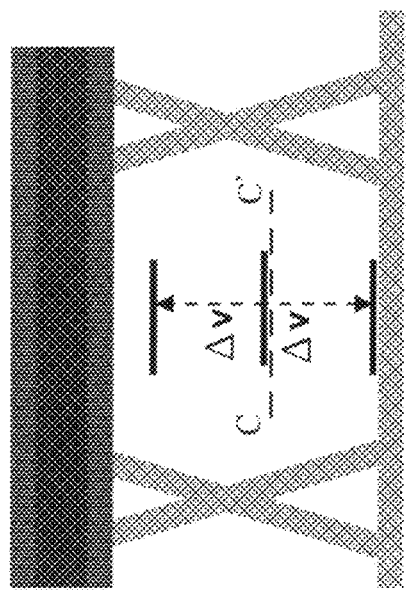
FIG. 6A is a schematic diagram illustrating slicing level adjusted to have equal spacing to +1 and −1 boundary according to one embodiment of the present invention.

In one embodiment, as in FIG. 6A, if ASE is the major hindering factor of the system performance, the slicing level (threshold) of Sampler C might simply be the average of that of Sampler T and Sampler B. On the other hand, if the waveform is severely distorted, it would set the slicing level of Sampler C such that $\Delta t$ is maximal. FIG. 6B demonstrates the locations of the samplers on the eye.

Furthermore, in another embodiment it is possible for vertical threshold adjustment and horizontal sampling phase adjustment to work independently. Clock and data recovery loop 55 can solely determine the sampling phase while the proposed scheme only handles the slicing level. Sampler C can merge with the phase detector of the clock and data recovery loop to save area and power.

Figure 7:
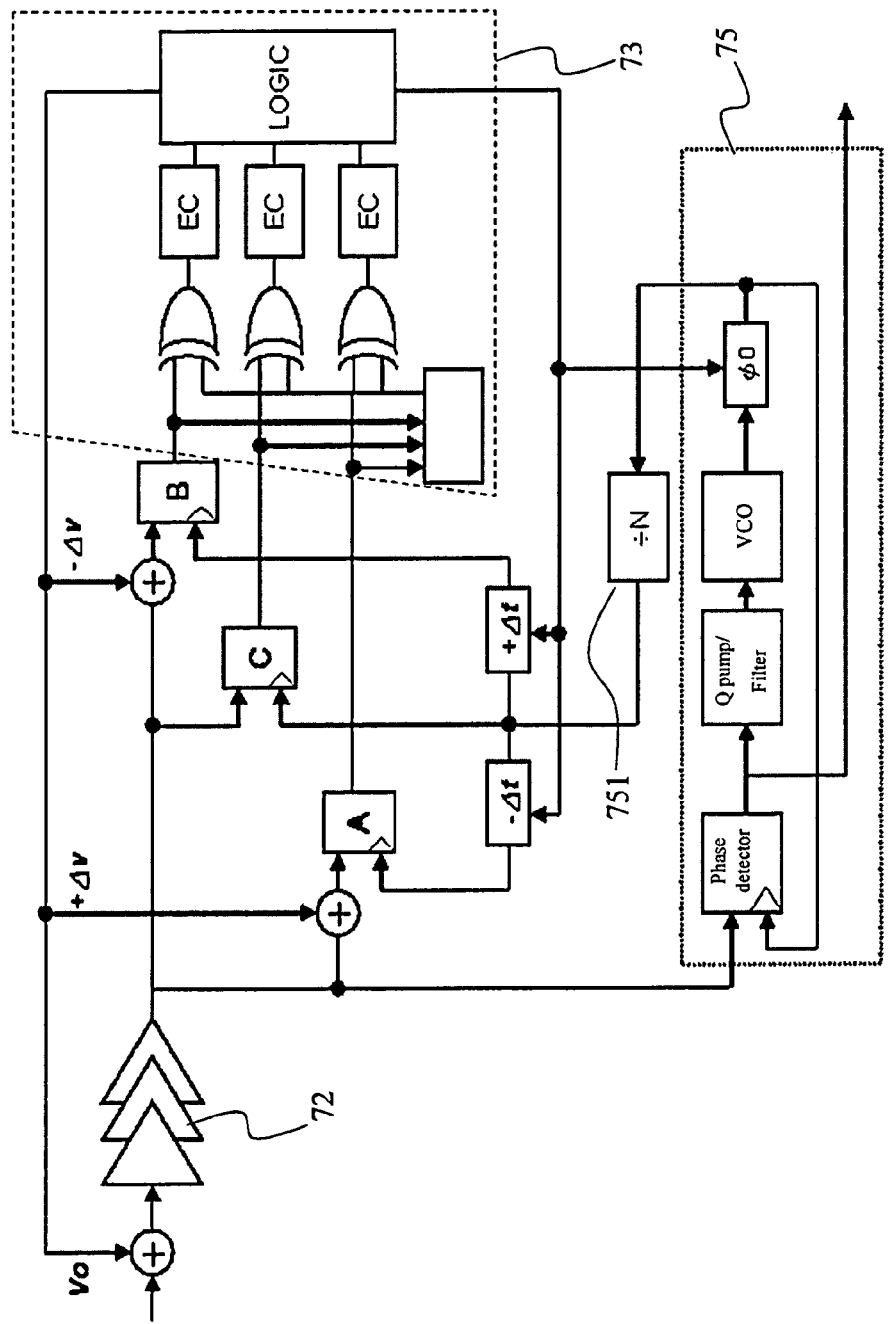
FIG. 7 is another schematic diagram illustrating a slicing level and sampling phase adaptation circuitry for data recovery systems according to one embodiment of the present invention.

FIG. 7 is a schematic diagram illustrating a slicing level and sampling phase adaptation circuitry for data recovery systems according to one embodiment of the present invention. The sampling circuit has Sampler A, Sampler B and Sampler C receiving the data from amplifier and frequency division signals, outputting slicing levels and sampling phases respectively, for each of samplers receiving the processed data and the timing margin and outputting the plurality of slicing levels. The control circuit 73 is coupled to the Sampler A, Sampler B and Sampler C, receiving the phase differences, which are compared to produce a phase difference fed back to adjust the processed data; wherein the control circuit 73 receives the sampling phases, compares the sampling phases for a timing margin fed back to adjust the time division signals.

The clock and data recovery loop 75 receives the processed data, and recovering system clock signals from the processed data, wherein the system clock signals are transferred to next stage circuitry. The clock and data recovery loop 75 receives the timing margin for the adjustment of clock signals for the sampling circuit.

Accordingly, if all the samplers' threshold and sampling phase are adjustable, the invention can use only three samplers. Sampler A and Sampler B can be treated as "Early" and "Late" samplers if they have the same threshold; they can also be treated as "Top" and "Bottom" samplers if their sampling phase are identical. In this case less loading is imposed onto the preceding amplifier. Also, power and area can potentially be saved.

The clock signals from clock and data recovery loop 75 are divided by divider 751, then being output the frequency division signals to the sampling circuit. Since the bit error rate estimation is a relative long-term process, it is possible to lower the sampling clock frequency (sub-sampling) of the samplers to minimize power/area penalty. Operating the circuitry of the samplers and decision logic 73 at lower speed enables using simpler circuit topologies. Lowering the sampling clock frequency by N is equivalent to case a vote for every N bits. As long as enough observation is made, the sub-sampling approach does not compromise system performance.

Figure 8A:
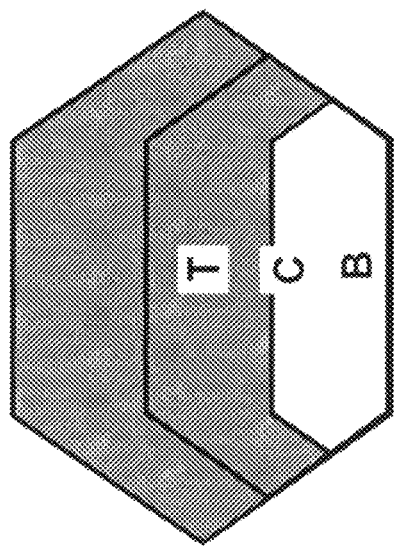
FIG. 8A is a schematic diagram illustrating over sampling technique errors occur at both top and bottom according to one embodiment of the present invention.
Figure 8B:
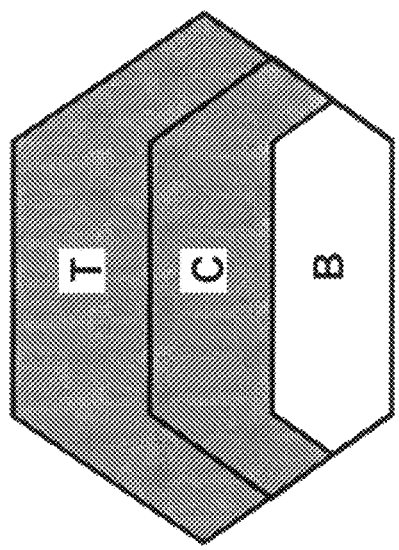
FIG. 8B is a schematic diagram illustrating eye opening after adjusting the location of samplers according to one embodiment of the present invention.

FIG. 8A is the case when the center sampler obtains the wrong data some time. The minority votes can appear both on Top and Bottom. The algorithm identifies that the setting is unreliable. The algorithm can move the sampler to another setting as that in FIG. 8B. Now Sampler C and Sampler B always agree on one value while minority vote can only appear on Top. Algorithm can conclude that Sampler C and Sampler B are clean while Sampler T is dirty. The proposed over sampling scheme is superior.

In the invention the data recovery system can easily find the optimal slicing level and the most favorable sampling phase such that the system bit error rate is minimized, the majority vote can find the eye opening more reliably and have no convergence problem. The invention enables systems to find the optimal slicing level and sampling point based on bit error rate bit error rate estimation. Bit error rate estimation is achieved by oversampling the incoming data and using majority voting.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A slicing level and sampling phase adaptation circuitry for data recovery systems, comprising:
    a slicing level adjustment element, receiving a processed data and frequency division signals and comparing the processed data and the frequency division signals for generating a phase difference, wherein the phase difference being fed back to an input of the slicing level adjustment element to rectify the processed data;
    a sampling period adjustment element, receiving the processed data and time division signals and comparing the processed data and the time division signals for a timing margin, wherein the timing margin is fed back to the input of the sampling period adjustment element to adjust the frequency division signals and then becoming the time division signals; and
    a clock and data recovery loop, receiving the processed data and recovering system clock signals from the processed data, wherein the system clock signals are transferred to next stage circuitry and wherein the clock and data recovery loop receives the timing margin for the adjustment of system clock signals, and the system clock signals are transferred to the slicing level adjustment element and the sampling period adjustment element.

2. The slicing level and sampling phase adaptation circuitry for data recovery systems according to claim 1, further comprising an amplifier electrically coupled to the slicing level adjustment element, the sampling period adjustment element and the clock and data recovery loop, receiving and amplifying unprocessed data, then outputting the processed data.

3. The slicing level and sampling phase adaptation circuitry for data recovery systems according to claim 2, wherein the amplifier is selected from the group consisting of a linear amplifier and a limited amplifier.

4. The slicing level and sampling phase adaptation circuitry for data recovery systems according to claim 2, wherein the input of amplifier is coupled to an adder and receives the phase difference to correct the unprocessed data.

5. The slicing level and sampling phase adaptation circuitry for data recovery systems according to claim 1, wherein the system clock signals from clock and data recovery loop being divided through a divider, outputting the frequency division signals to the slicing level adjustment element and the sampling period adjustment element.

6. The slicing level and sampling phase adaptation circuitry for data recovery systems according to claim 1, wherein the slicing level adjustment element communicates with the sampling period adjustment element for adjustment there between.

7. A slicing level and sampling phase adaptation circuitry for data recovery systems, comprising:
    a slicing level adjustment assembly, receiving processed data and frequency division signals and outputting a plurality of slicing levels;
    a slicing level controller, being coupled to the slicing level adjustment assembly and receiving the plurality of slicing levels, wherein the plurality of slicing levels are compared for a phase difference fed back to adjust the processed data;
    a sampling period adjustment assembly, receiving the processed data and time division signals and outputting a plurality of sampling phases;
    a sampling period controller, being coupled to the sampling period adjustment assembly and receiving the plurality of sampling phases, wherein the plurality of sampling phases are compared for a timing margin fed back to adjust the time division signals; and
    a clock and data recovery loop, receiving the processed data and recovering system clock signals from the processed data, wherein the system clock signals are transferred to next stage circuitry and wherein the clock and data recovery loop receives the timing margin for the adjustment of system clock signals for the slicing level adjustment assembly and the sampling period adjustment assembly.

8. The slicing level and sampling phase adaptation circuitry for data recovery systems according to in claim 7, further comprising an amplifier coupled to the slicing level adjustment assembly and the sampling period adjustment assembly and the clock and data recovery loop, wherein the amplifier receives and amplifies unprocessed data, then outputting the processed data signals.

9. The slicing level and sampling phase adaptation circuitry for data recovery systems according to claim 8, wherein the amplifier is selected from the group consisting of a linear amplifier and a limited amplifier.

10. The slicing level and sampling phase adaptation circuitry for data recovery systems according to claim 8, wherein the input of amplifier being coupled to an adder, wherein the adder being coupled to the slicing level controller and receiving the phase difference to adjust the unprocessed data.

11. The slicing level and sampling phase adaptation circuitry for data recovery systems according to claim 7, wherein the slicing level adjustment assembly comprises a plurality of samplers for each of the plurality of samplers receiving the processed data and the frequency division signals and outputting the plurality of slicing levels.

12. The slicing level and sampling phase adaptation circuitry for data recovery systems according to claim 7, wherein the sampling period adjustment assembly comprises a plurality of samplers for each of the plurality of samplers receiving the processed data and the time division signals and outputting the plurality of sampling phases.

13. The slicing level and sampling phase adaptation circuitry for data recovery systems according to claim 7, wherein the system clock signals from the clock and data recovery loop divided by a divider being output the frequency division signals to the slicing level adjustment assembly and the sampling period adjustment assembly.

14. The slicing level and sampling phase adaptation circuitry for data recovery systems according to claim 7, wherein the slicing level controller communicates with the sampling period controller for adjustment there between.

15. A slicing level and sampling phase adaptation circuitry for data recovery systems, comprising:
- a sampling circuit, receiving processed data and frequency division signals and outputting a plurality of slicing levels and a plurality of sampling phases;
- a control circuit, being coupled to the sampling circuit and receiving the plurality of slicing levels, wherein the plurality of slicing levels are compared for a phase difference fed back to adjust the processed data, wherein the control circuit receives the plurality of sampling phases and compares the plurality of sampling phases for a timing margin fed back to adjust time division signals; and
- a clock and data recovery loop, receiving the processed data and recovering system clock signals from the processed data, wherein the system clock signals are transferred to next stage circuitry and wherein the clock and data recovery loop for receives the timing margin to adjust the frequency division signals for the sampling circuit.

16. The slicing level and sampling phase adaptation circuitry for data recovery systems according to claim 15, further comprising an amplifier coupled to the sampling circuit and the clock and data recovery loop, wherein the amplifier receives and amplifies unprocessed data and then outputting the processed data.

17. The slicing level and sampling phase adaptation circuitry for data recovery systems according to claim 16, wherein the amplifier is a linear amplifier or a limited amplifier.

18. The slicing level and sampling phase adaptation circuitry for data recovery systems according to claim 15, wherein the input of amplifier being coupled to an adder, wherein the adder being coupled to the control circuit and receives the phase difference to adjust the unprocessed data.

19. The slicing level and sampling phase adaptation circuitry for data recovery systems according to claim 15, wherein the sampling circuit comprises a plurality of samplers for each of the plurality of samplers receiving the processed data and the timing margin and outputting the plurality of slicing levels and sampling phases.

20. The slicing level and sampling phase adaptation circuitry for data recovery systems according to claim 15, wherein the system clock signals from the clock and data recovery loop are divided by a divider and then output the frequency division signals to the sampling circuit.

* * * * *